United States Patent Office 3,432,402
Patented Mar. 11, 1969

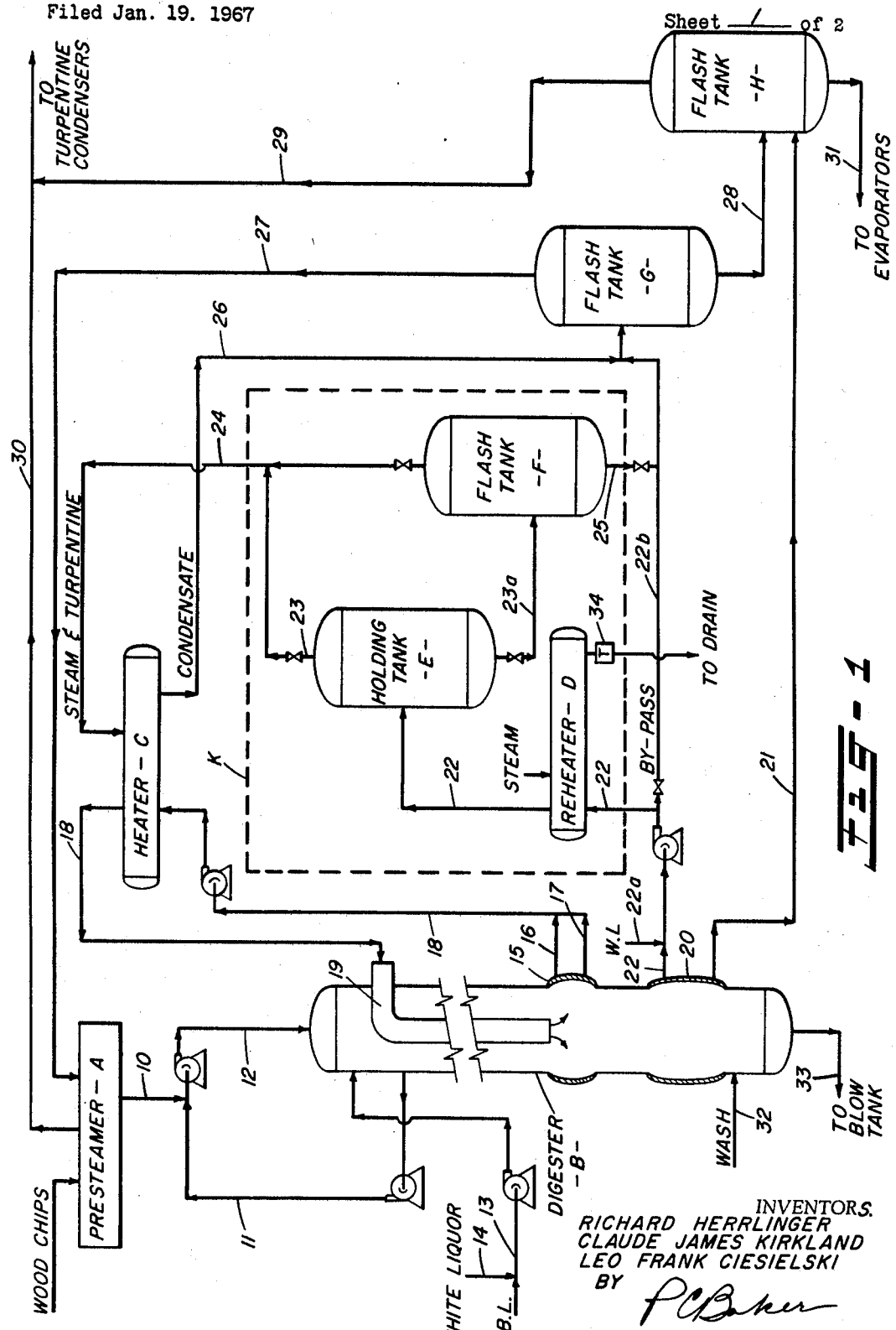

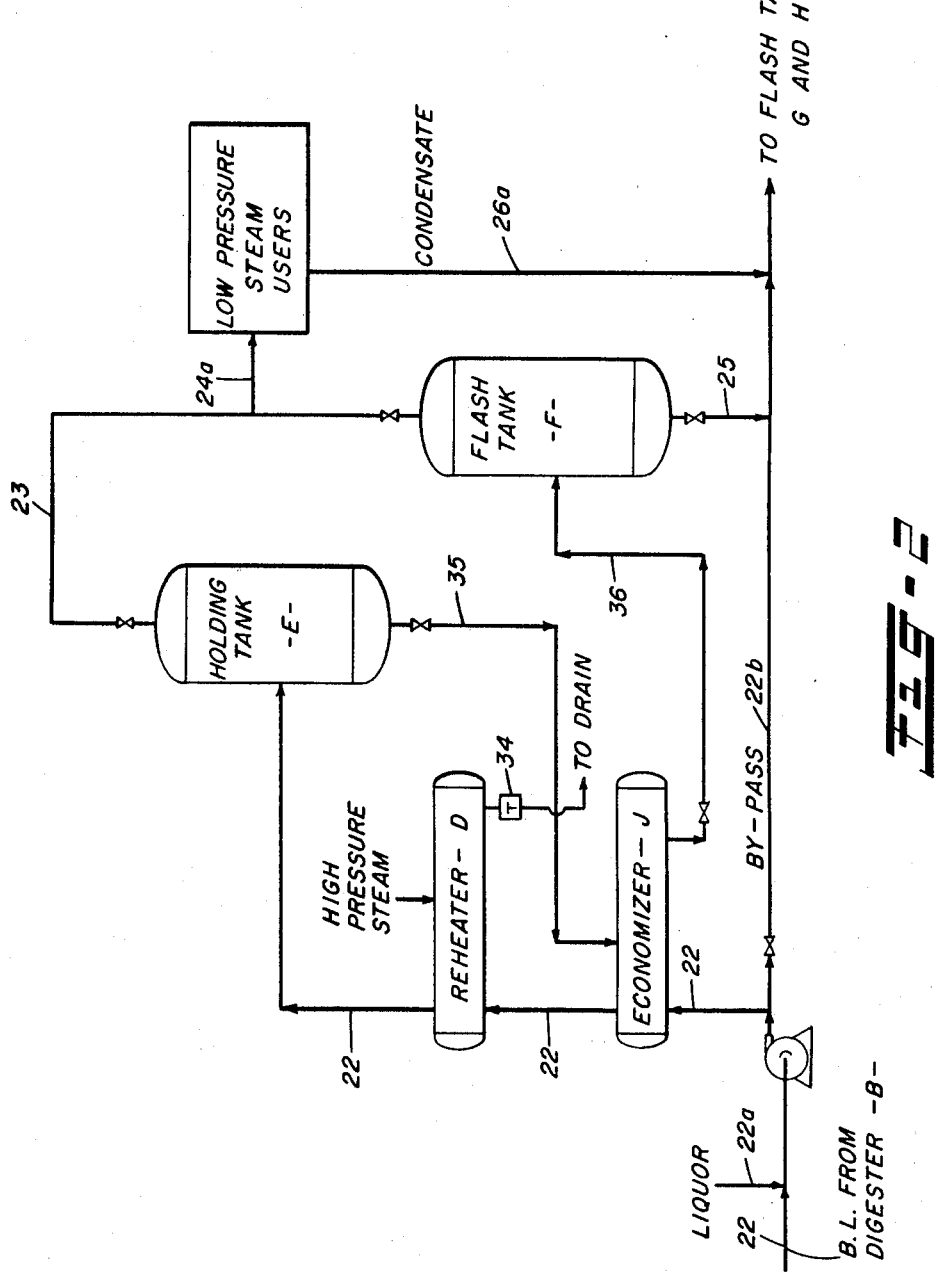

3,432,402
RECOVERY OF TURPENTINE FROM BLACK
LIQUOR
Richard Herrlinger, Panama City, Fla., Claude James
Kirkland, Ridgewood, N.J., and Leo Frank Ciesielski,
Panama City, Fla., assignors to Arizona Chemical Company, a corporation of Delaware
Filed Jan. 19, 1967, Ser. No. 610,392
U.S. Cl. 203—37                              5 Claims
Int. Cl. B01d 3/00; C07c 7/04

ABSTRACT OF THE DISCLOSURE

Process for increasing the yield of turpentine byproduct from the continuous digestion (Kamyr) sulfate paper process which comprises reheating (typically to 330–400° F.) the black liquor from the Kamyr digester, flashing the reheated black liquor, and condensing the resulting volatized turpentine.

Background

This invention relates to a process for recovering turpentine from the black liquor resulting from the continuous digestion of wood in the sulfate or kraft paper process.

Until recently, digestion of wood pulp according to the sulfate or kraft paper process has been carried out in manually operated batch digesters. The digesters are charged with wood chips and a solution of sodium hydroxide (white liquor) and sodium sulfide. Steam is introduced at the bottom and the mixture is cooked until a desired level of internal pressure and temperature is reached. Cooking conditions vary according to the type of wood used and the desired quality of the pulp to be produced. Generally, the pulp is cooked 45 to 90 minutes or for time sufficient to bring the charge to maximum pressure, about 90 to 111 p.s.i.g., and the charge is then held at this high pressure for about 30 to 90 minutes longer. During the cooking, non-cellulosic constituents, including lignin, rosin and fatty acids, go into solution as a dark alkaline mixture called "black liquor."

Also during the cooking, vapors, including non-densable gases, steam and turpentine, are vented from the top of the digester. The turpentine is then condensed with the steam and recovered. As part of the process also, the black liquor is washed out of the wood pulp and the useful constituents are separated.

Recovery of the turpentine from the byproducts of the sulfate paper process is an important industry. The turpentine is used as a raw material for the production of lubricant additives, insecticides, resins, synthetic flavors and synthetic perfumes. Turpentine recovery from the batch process has been effective, generally yielding from 1 to 3 gallons per cord of pine charged.

Presently, such batch processes are being replaced by the "Kamyr" process. This is a continuous digestion process in which wood chips and digestion liquor (a solution of sodium hydroxide and sodium sulfide) are continuously charged at the top of a tall pressure vessel (digester) and passed down through zones of increasing temperature. The pulp which reaches the bottom of the digester is cooled and washed with dilute black liquor before being discharged at the bottom of the digester.

Black liquor is taken off in streams at several points of the vessel. One stream, at the temperature for optimum digestion, is drawn off through screens at a point intermediate in the digester and is passed through an outside heater for recirculation to the digester. Another stream, at the lower, cooler end of the digester, is drawn off through screens and sent to one or more flash tanks for release of the volatile components including steam and turpentine. The turpentine is then recovered by condensation.

Although the continuous digestion sulfate paper process increases the yield and quality of the cellulose extracted from the wood, while also reducing labor and steam costs, the amount of turpentine recovered is low compared with the yield from the superseded batch process, being in the order of not more than about 65% of the batch process yield even under carefully controlled conditions.

Summary

An object of the present invention, therefore, is to increase the yield of turpentine from the continuous digestion sulfate paper process without detracting from the established benefits of said process.

Accordingly, it has now been discovered that the yield of turpentine as a byproduct of the continuous digestion sulfate process may be substantially increased by reheating the black liquor, outside the continuous digester, under conditions of temperature, time and pressure effective to release substantially all of the turpentine present in said black liquor, whether the turpentine be present therein in a volatile or non-volatile form. In effect, substantially all of the turpentine in the black liquor is volatized and then condensed.

Description

Some of the turpentine in the black liquor is described herein as being in a "non-volatile" form. By this is meant that portion of the turpentine which is bound up as polymers or other products in the black liquor and which is not evolved under the cooking conditions of the continuous digestion sulfate paper process. Applicants theorize that turpentine yield is low under the conventional continuous digestion conditions because some of the turpentine remains in the black liquor in a bound, polymeric, or otherwise non-volatile form due to the somewhat milder conditions of temperature and pressure employed in the continuous digestion process as compared with the more stringent conditions of the former batch process. By the reheating step of the present invention, the bound turpentine is released or converted to a volatizable form along with the volatile or unbound turpentine released from the black liquor of the continuous digester. By transfer to a zone of lower pressure the black liquor containing the volatizable turpentine is volatized (flashed) and thereafter condensed. It is understood, of course, that the invention is not limited by such considerations of mechanism but is to be construed broadly in accordance with the following description.

FIGURE 1 of the accompanying drawing is a flowsheet descriptive of the continuous digestion sulfate paper process as modified by the the present invention.

FIGURE 2 is a flowsheet describing a preferred embodiment of the invention suitable for insertion in the area enclosed by broken line K in FIGURE 1.

With reference to FIGURE 1, it should first be noted that the area enclosed by broken line K shows apparatus and steps by which the known continuous digestion sulfate paper process is distinguished from the modification which is the subject of this invention. Thus, the known process is represented in the area outside the broken line K and a modification, typical of the invention, is illustrated in the area enclosed by broken line K. In simplified outline the process operates as follows:

Wood chips are continuously fed into presteamer vessel A and extensively steamed at about 18 p.s.i.g. The steamed chips then pass by line 10, are fluidized with digester liquor proceeding from digester column B via line 11, and the two streams are pumped into digester B. Digester B operates under a hydraulic pressure of about 150 to 165 p.s.i.g., high enough to prevent boiling at any point within the digester. The mixture of digester liquor and chips moves downward and converges with sodium hydroxide solution ("white liquor"—W.L.) pumped from line 14 in admixture with concentrated black liquor (B.L.) from line 13. The total mixture is brought gradually to the optimum cooking temperature of about 290–330° F. by contact with recirculated digester liquor entering by conduit 19. The digester liquor, in turn, is taken off through screen 15 as side stream 16 or 17 and pumped through line 18 to heater C for recirculation to digester B. At the lower and cooler section of digester B, black liquor is discharged through screen 20 and line 21 to flash tank H held at a pressure of about 5 p.s.i.g. The volatized steam and turpentine released from flash tank H and presteamer A passes directly by lines 29 and 30, respectively, to turpentine condensers (not shown).

In the known continuous digestion process, a second stream of black liquor at a somewhat higher temperature is passed through screen 20 and lines 22 and 22b to flash tank G held at about 18 p.s.i.g. The volatized steam and turpentine from flash tank G passes by line 27 to presteamer A and from there ultimately to the turpentine condensers (not shown).

In the modification of the continuous digester process, according to the present invention, by-pass line 22b is closed and the black liquor is passed through reheater D and then to holding tank E. Holding tank E is operated at a temperature and saturation pressure effective for depolymerization or change of the non-volatile or otherwise bound turpentine in the black liquor to a form which can be volatized. The depolymerization or change of said non-volatile or bound turpentine to a volatilizable form is a function of temperature, pressure and holding time. While the black liquor stream may be reheated to the optimum digester temperature, about 290 to 330° F., in practice this is not economical since the holding time would have to be correspondingly increased. Preferably, therefore, the black liquor is heated to a temperature higher than that for optimum cooking in digester B. Effective conditions are about 330° F. to about 400° F. while holding for about 60 to 210 minutes at holding pressures in the range of about 90 to about 220 p.s.i.g., preferably 110 to 200 p.s.i.g. Reheating may be accomplished directly with steam or indirectly by known heat exchange means.

The resulting mixture of black liquor and volatizable turpentine from holding tank E is then passed by line 23a to flash tank F operated at a pressure lower than that of holding tank E. Volatized steam and turpentine from flash tank F and blow off gases from holding tank E combine in line 24 and pass to digester liquor heater C. Condensate from heater C flows by line 26 to flash tank G. Also, black liquor from flash tank F flows by line 25 to flash tank G and then to flash tank H as already described. The volatized turpentine and steam which flashes off in these vessels eventually enters the turpentine condensers (not shown). Flash tanks F, G and H are operated at successively lower pressures so as to facilitate volatization of the turpentine. The spent digester liquor from flash tank H passes by line 31 to multiple evaporators (not shown) for recovery of sodium hydroxide.

Not shown are additional liquor heaters, similar to C, usually employed in continuous digesters. These may also be served by steam and turpentine vapor from flash tank E in the same manner as heater C.

Other features of the continuous digestion process, not essential to appreciation of the invention, are the counter-current washing and cooling of the pulp at the lower end of digester B with dilute black liquor wash entering by line 32, discharge of the digested pulp to a blow tank (not shown) by line 33, and optional means for introduction of white liquor (W.L.) by line 22a, for example. Although not essential for recovery of the turpentine, introduction of additional white liquor by line 22a promotes depolymerization and release of the non-volatile turpentine in the black liquor.

FIGURE 2 shows substantially the same process modification defined by the area enclosed by broken line K of FIGURE 1 with the addition of economizer J. According to FIGURE 2, black liquor (B.L.) from digester B is pumped through line 22, optionally after addition of white liquor by line 22a, to economizer J where it is heated by hot black liquor passing at high pressure from holding tank E. The temperature of the black liquor is further increased in reheater D by steam under high pressure, e.g., about 450 p.s.i.g. Thereafter, the reheated black liquor is held in holding tank E. Non-condensable gases and the more volatile components are from time to time released as flow-off by line 23 and the liquor passed by line 35 through economizer J and from there by line 36 to flash tank F for volatization of steam and turpentine. Steam under reduced pressure is taken off flash tank F by line 24a and is conducted to low pressure steam users (not shown) which could be one or more units of the same overall process, such as heater C of FIGURE 1. Condensate from low pressure steam users passes by line 26a to flash tanks G and H. The liberated turpentine and the steam, which flashes off from these vessels, passes to turpentine condensers and the stripped black liquor goes to the evaporators as indicated with reference to FIGURE 1. In both FIGURES 1 and 2 reheater D is drained through trap 34.

Use of economizer J according to the scheme of FIGURE 2 effectively reduces the quantity of costly high pressure steam normally employed in reheater D. Low pressure steam, produced as a byproduct, may be employed in other plant uses or for recycle to another heater unit in the same process. The overall result is greater economy of the turpentine recovery process.

While reducing the pressure of the black liquor stream from the digester and then reheating, volatizing, and condensing is possible, see the example below, the invention is more conveniently practiced with respect to the black liquor taken under pressure from the continuous digester, as described above with reference to the drawings.

The following example is presented to demonstrate the criticality of reheating the black liquor in order to increase the yield of turpentine.

EXAMPLE

Black liquor was obtained from a commercial continuous digester. It had been stripped of available, normally volatile, turpentine in the conventional equipment of the digester by flashing and subsequent condensation. The stripped black liquor was then reheated and held in a pressure vessel under various conditions of time, temperature and pressure, with and without the addition of extra alkali, in order to release and recover additional turpentine. The additional turpentine obtained is given as gallons of turpentine per cord of pine charged to the digester. The yields are compared in Table I with that obtained by extensive steam stripping of an equivalent black liquor sample under atmospheric pressure (Run 1). From this data it is evident that steam stripping alone will not substantially improve the yield of turpentine from black liquor and that reheating is required to attain this objective.

TABLE

| Run | Conditions | Additional turpentine yield, gals./cord of pine |
|---|---|---|
| 1 | Steam stripping for 12 hours at atmospheric pressure. | 0.043 |
| 2 | Heating over 90 minutes to 344° F. and 110 p.s.i.g.; held for additional 210 minutes. | 1.13 |
| 3 | Same as run 2 | 1.01 |
| 4 | Same as run 2 except held only 60 minutes | 0.66 |
| 5 | Same as run 3 | 0.99 |
| 6 | Same as run 3 except that, while being held, the black liquor was circulated through a heat exchanger. | 0.75 |
| 7 | Heating over 90 minutes to 331° F. and 90 p.s.i.g.; held for 60 minutes with addition of steam. | 0.49 |
| 8 | Same as run 7 except that the solution treated was 50/50 volume mixture of the black liquor and white liquor. | 0.76 |

We claim:

1. A process for the recovery of turpentine from black liquor containing the turpentine in a bound, non-volatile form, which process comprises continuously digesting a mixture of pine wood chips and a cooking liquor containing sodium hydroxide and sodium sulfide by moving it downwardly through a vertical digester at digestion temperatures and at pressures such as to prevent boiling while the non-cellulosic constituents of the wood including turpentine are extracted into the cooking liquor, withdrawing a stream of the resulting black liquor from the residual cellulose and recovering the turpentine therefrom by first heating it at temperatures higher than said digestion temperatures for a time sufficient to convert bound turpentine therein to a volatilizable form and then flashing substantially all of the turpentine from said liquor along with steam by reducing the pressure thereon.

2. A process according to claim 1 wherein the withdrawn black liquor is heated to about 330° F. to about 400° F. and held for about 60 to 210 minutes under a pressure of about 90 to 220 p.s.i.g.

3. A method according to claim 2 wherein the black liquor withdrawn from the digester is heated by passing it in heat exchange relation with black liquor from the holding step.

4. A process according to claim 1 wherein unbound turpentine is separated from the withdrawn black liquor before it is heated to said higher temperatures.

5. A process according to claim 1 wherein caustic is added to the withdrawn black liquor before it is heated to said higher temperatures.

References Cited

UNITED STATES PATENTS

| 1,795,557 | 3/1931 | Hagglund | 162—16 |
| 2,999,044 | 9/1961 | Collins. | |
| 3,286,763 | 11/1966 | Jacoby | 202—185 X |
| 942,106 | 12/1909 | Rowley | 162—16 |
| 1,169,325 | 1/1916 | Freeman | 162—15 |
| 1,938,693 | 12/1933 | Gillespie et al. | 260—675.5 X |
| 2,283,067 | 5/1942 | Jennings | 260—675.5 |
| 2,459,570 | 1/1949 | McGregor | 162—15 |
| 2,591,106 | 4/1952 | Sutherland | 162—52 |

FOREIGN PATENTS

| 673,649 | 1/1930 | France. |
| 406,184 | 2/1934 | Great Britain. |

NORMAN YUDKOFF, *Primary Examiner.*

F. E. DRUMMOND, *Assistant Examiner.*

U.S. Cl. X.R.

159—47; 162—16; 203—88; 202—185

UNITED STATES PATENT OFFICE
CERTIFICATE OF CORRECTION

Patent No. 3,432,402                              March 11, 1969

Richard Herrlinger et al.

It is certified that error appears in the above identified patent and that said Letters Patent are hereby corrected as shown below:

Column 1, line 56, "3" should read -- 2 --.

Signed and sealed this 7th day of April 1970.

(SEAL)
Attest:

Edward M. Fletcher, Jr.                      WILLIAM E. SCHUYLER, JR.
Attesting Officer                              Commissioner of Patents